L. M. NORRIS.
ELECTRICALLY OPERATED DOOR.
APPLICATION FILED MAY 5, 1920.

1,365,266.

Patented Jan. 11, 1921.
2 SHEETS—SHEET 1.

WITNESSES:
Chas. O. Olsen
B. J. McLeod

INVENTOR.
L. M. Norris

L. M. NORRIS.
ELECTRICALLY OPERATED DOOR.
APPLICATION FILED MAY 5, 1920.
1,365,266.
Patented Jan. 11, 1921.
8 SHEETS—SHEET 2.
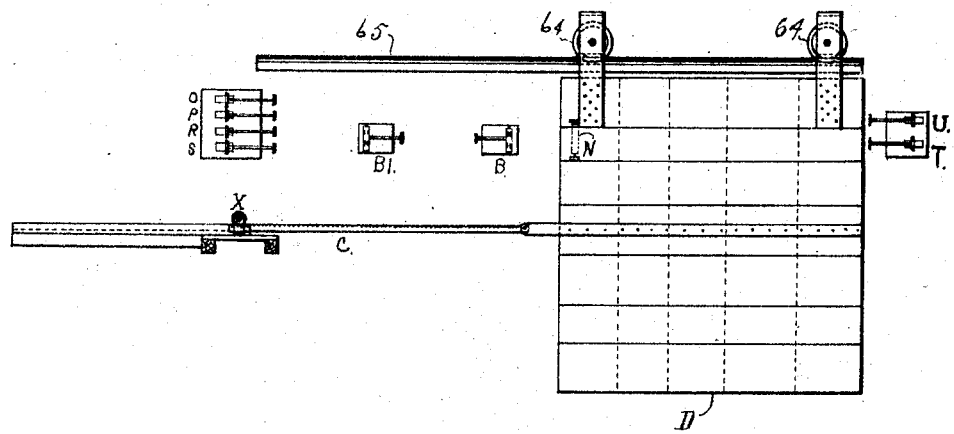
Fig. 2.
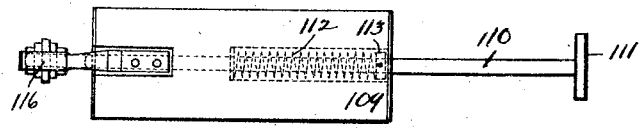
Fig. 3
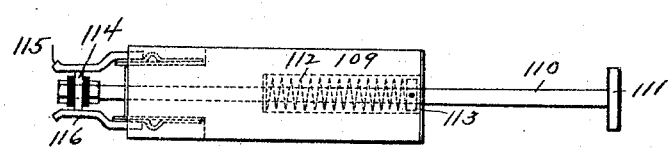
Fig. 3ª
WITNESSES:
Chas. O. Olsen.
R. J. McLeod
INVENTOR.
L. M. Norris L. M. NORRIS.
ELECTRICALLY OPERATED DOOR.
APPLICATION FILED MAY 5, 1920.
1,365,266.
Patented Jan. 11, 1921.
8 SHEETS—SHEET 3.
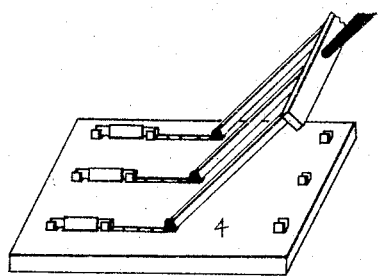
Fig. 4.
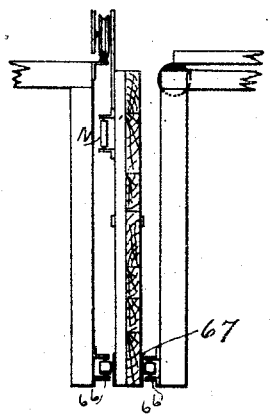
Fig. 5.
Fig. 6.
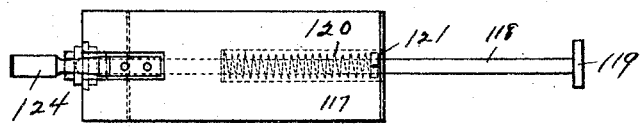
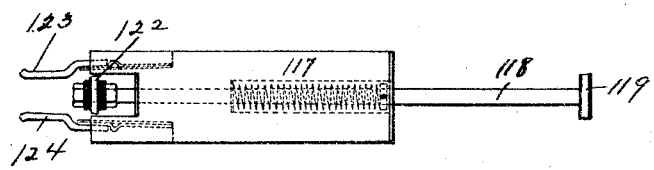
Fig. 6ª.
WITNESSES;
Chas. O. Olsen.
R. J. McLeod
INVENTOR.
L. M. Norris

L. M. NORRIS.
ELECTRICALLY OPERATED DOOR.
APPLICATION FILED MAY 5, 1920.

1,365,266.

Patented Jan. 11, 1921.
8 SHEETS—SHEET 4.

Fig. 7.ᵃ

WITNESSES:
Chas. O. Olsen
R. J. McLeod

INVENTOR.
L. M. Norris

L. M. NORRIS.
ELECTRICALLY OPERATED DOOR.
APPLICATION FILED MAY 5, 1920.
1,365,266.
Patented Jan. 11, 1921.
8 SHEETS—SHEET 5.
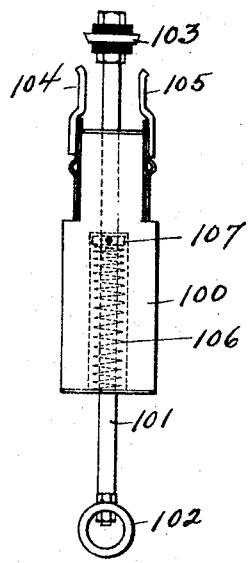
Fig. 11.
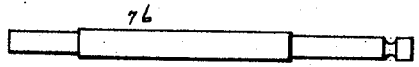
Fig. 12.
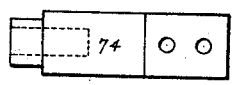
Fig. 13.
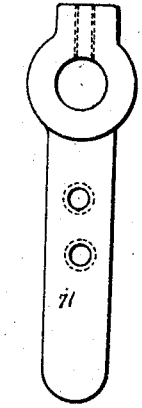
Fig. 14.
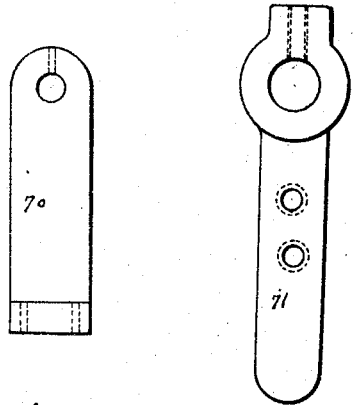
Fig. 15.
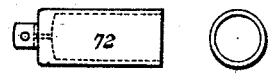
Fig. 16.
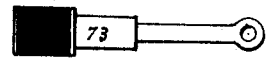
Fig. 16.ᵃ
WITNESSES:
Chas. O. Olsen
R. J. McLeod
INVENTOR.
L. M. Norris

L. M. NORRIS.
ELECTRICALLY OPERATED DOOR.
APPLICATION FILED MAY 5, 1920.

1,365,266.

Patented Jan. 11, 1921.
8 SHEETS—SHEET 6.

WITNESSES:
Chas. O. Olsen
R. J. McLeod

INVENTOR.
L. M. Norris

L. M. NORRIS.
ELECTRICALLY OPERATED DOOR.
APPLICATION FILED MAY 5, 1920.

1,365,266.

Patented Jan. 11, 1921.
8 SHEETS—SHEET 8.

WITNESSES:
Chas. O. Olsen.
R. J. McLeod

INVENTOR.
L. M. Norris

UNITED STATES PATENT OFFICE.

LEROY M. NORRIS, OF MULLAN, IDAHO.

ELECTRICALLY-OPERATED DOOR.

1,365,266.  Specification of Letters Patent.  Patented Jan. 11, 1921.

Application filed May 5, 1920. Serial No. 379,047.

*To all whom it may concern:*

Be it known that I, LEROY M. NORRIS, a citizen of the United States of America, residing at Mullan, in the county of Shoshone and State of Idaho, have invented certain new and useful Improvements in Electrically-Operated Doors, of which the following is a specification.

This invention relates to electrically operated doors and it has for its object to provide a device of this character in conjunction with means whereby the door may be entirely controlled by electricity in such manner as to be automatically opened and closed upon the approach and passage of vehicles.

The door is particularly adapted for use at the entrance to tunnels, mines or the like, means being provided, in the nature of trolley operated switches for actuating the door at the proper time.

As the description proceeds it will be seen that effective means have been provided for guarding against accidental movement of the door and for permitting the actuation of the same in the event of failure of the ordinary operating means.

It is a further object of the invention to provide signals operable in conjunction with the door for indicating the position thereof to the operators of approaching vehicles.

Further objects and advantages of the invention will be set forth in the detailed description which now follows.

In the accompanying drawing—

Fig. 2 is a detailed view of the door;

Figure 7:
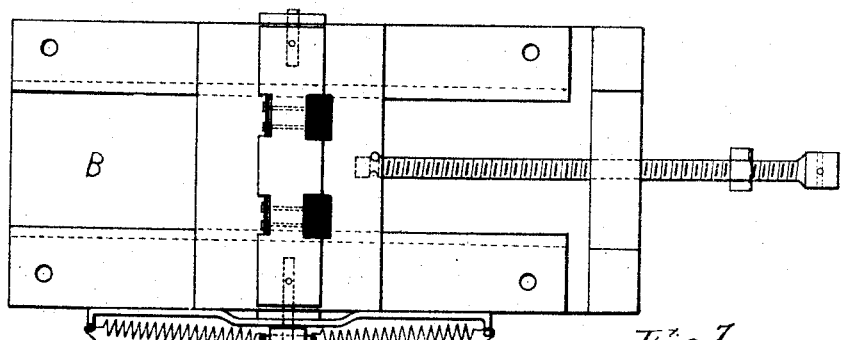
Figure 8:
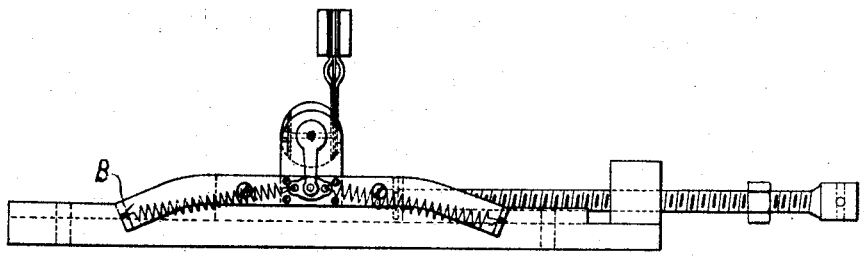
Figure 8:
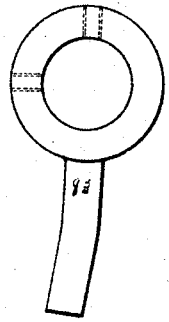
Figure 9:
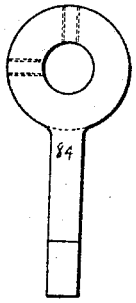
Figure 10:
Figure 17:
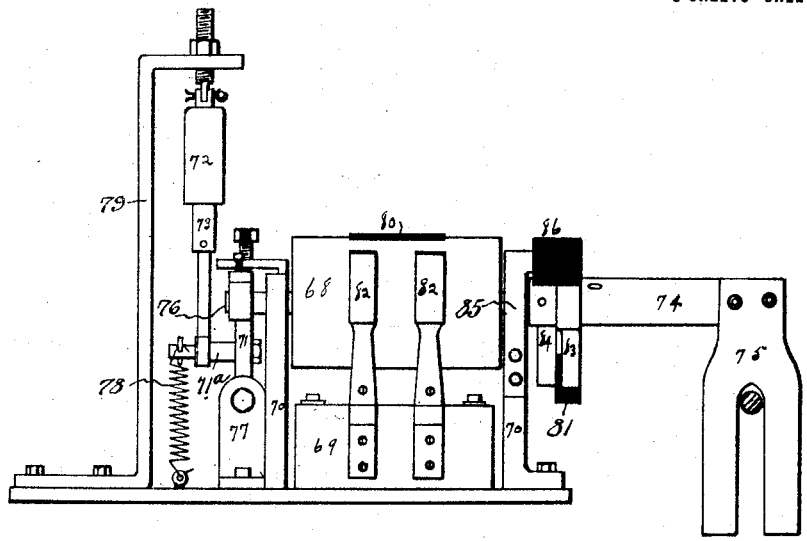
Figure 18:
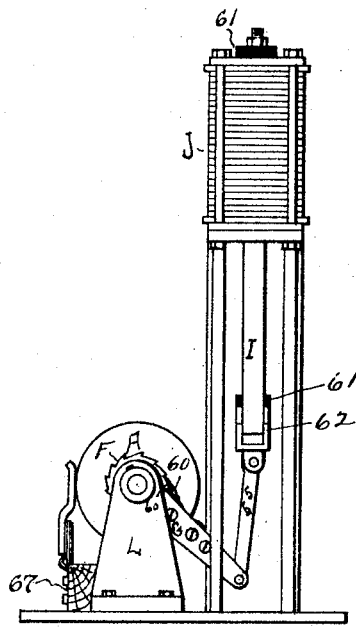
Figure 19:
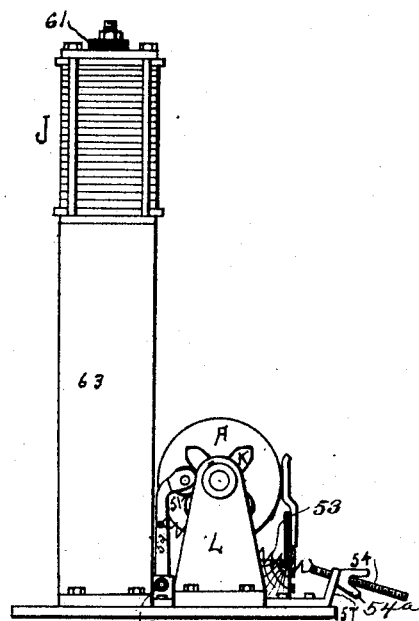
Figure 20:
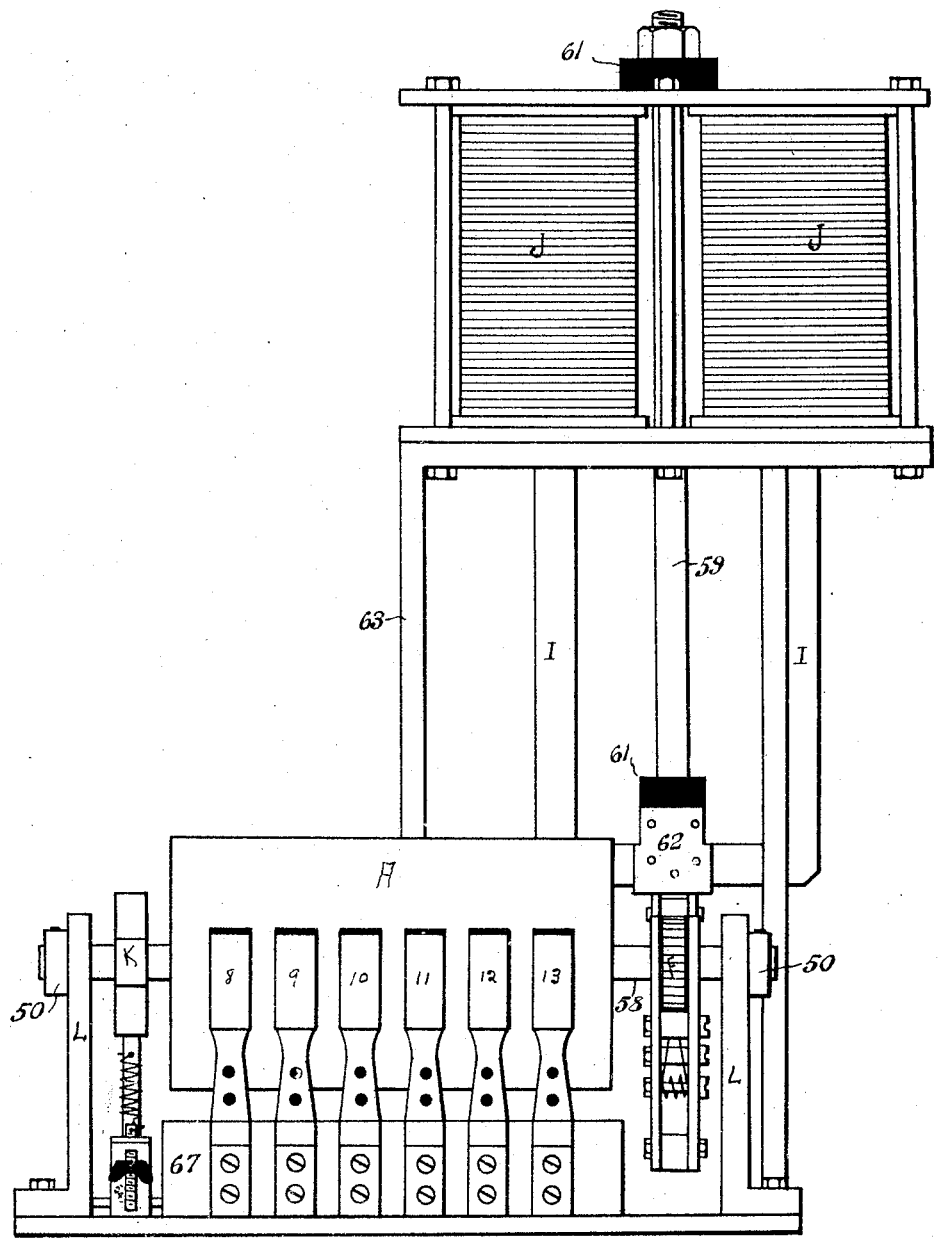
Figure 21:
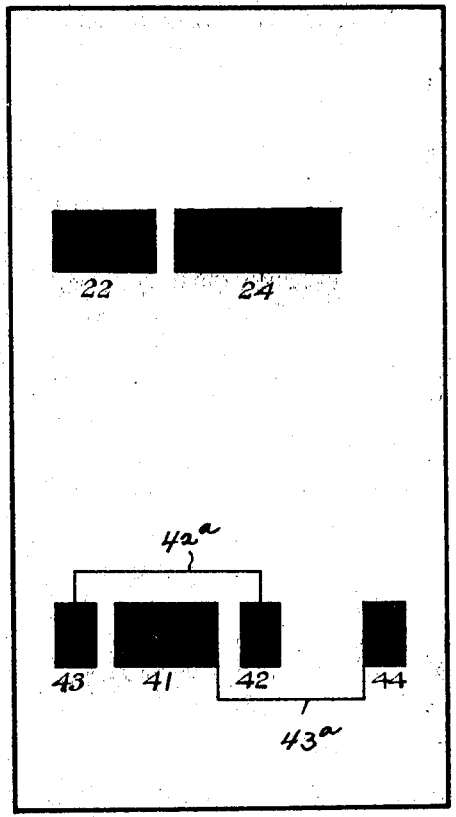
Figure 22:
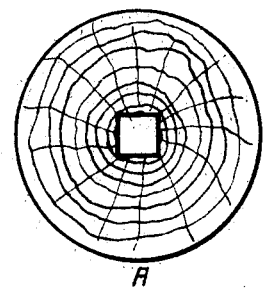
Figure 23:
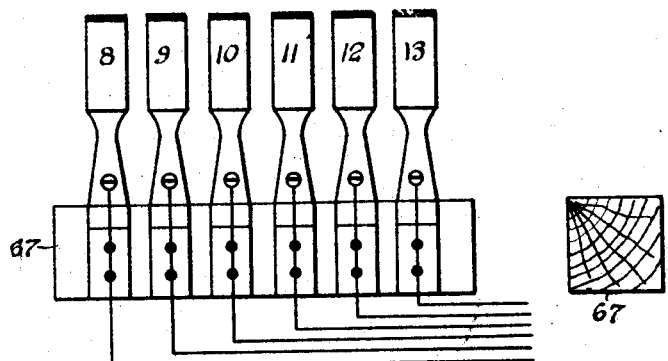

Figs. 3 and 3ª are respectively top and side views of switches, hereinafter described, which are spring actuated to closed position;

Fig. 4 is a perspective view of a threepole switch hereinafter described;

Fig. 5 is a transverse vertical sectional view of the door;

Figs. 6 and 6ª are respectively top and side views of switches, hereinafter described, that are spring actuated to open position;

Figs. 7 and 7ª are respectively plan and side views of door operated switches hereinafter described;

Figs. 8, 9 and 10 are elements of the trolley operated switch shown in Fig. 17 and hereinafter more particularly described;

Fig. 11 is a side view of a hand operated switch that is spring actuated to open position;

Fig. 12 is a detailed view of the shaft of the trolley operated switch;

Fig. 13 is a detail of a sleeve which engages the shaft of the trolley operated switch;

Fig. 14 is a detailed view of a bracket hereinafter described;

Fig. 15 is a detailed view of a swinging arm that is carried upon the main shaft of the trolley operated switch;

Fig. 16 is a detailed view of the cylinder of a dashpot, and Fig. 16ª is a detailed view of the plunger of the dashpot operable in conjunction with the trolley operated switch;

Fig. 17 is an assembled side view of the trolley operated switch;

Fig. 18 is an end elevation of the main controller;

Fig. 19 is an end elevation looking from the opposite end of the controller;

Fig. 20 is a side view of the controller;

Fig. 21 is a diagrammatic view illustrating the position of the several contact plates of the controller cylinder;

Fig. 22 is an end elevation of the controller cylinder;

Fig. 23 is a side view illustrating the contact fingers of the controller.

Like numerals designate corresponding parts throughout the several figures of the drawing.

Referring to the drawing D designates the door, said door being disposed at the mouth of a passage to be closed the sides of which are indicated at 49. This passage may be the entrance to a tunnel, a mine, a car barn or any other place the entrance to which it is desired to have closed. The door is preferably a horizontally sliding door and is mounted upon the track 65, through the medium of rollers 64 in a usual and well known way, the track and rollers being illustrated in Fig. 2. The door is preferably guided in its travels by rollers 66 which engage wear plates 67. The door carries an abutment N, the function of which is to engage and operate the several switches hereinafter described. The door carries a rack C, with which a pinion X meshes, said pinion being mounted upon a counter shaft Z that is connected by friction clutch V of conventional form with a section of shafting carrying a pinion Y that is driven from an electric motor M, said motor being a one horse power, three phase, induction motor.

Figure 1:
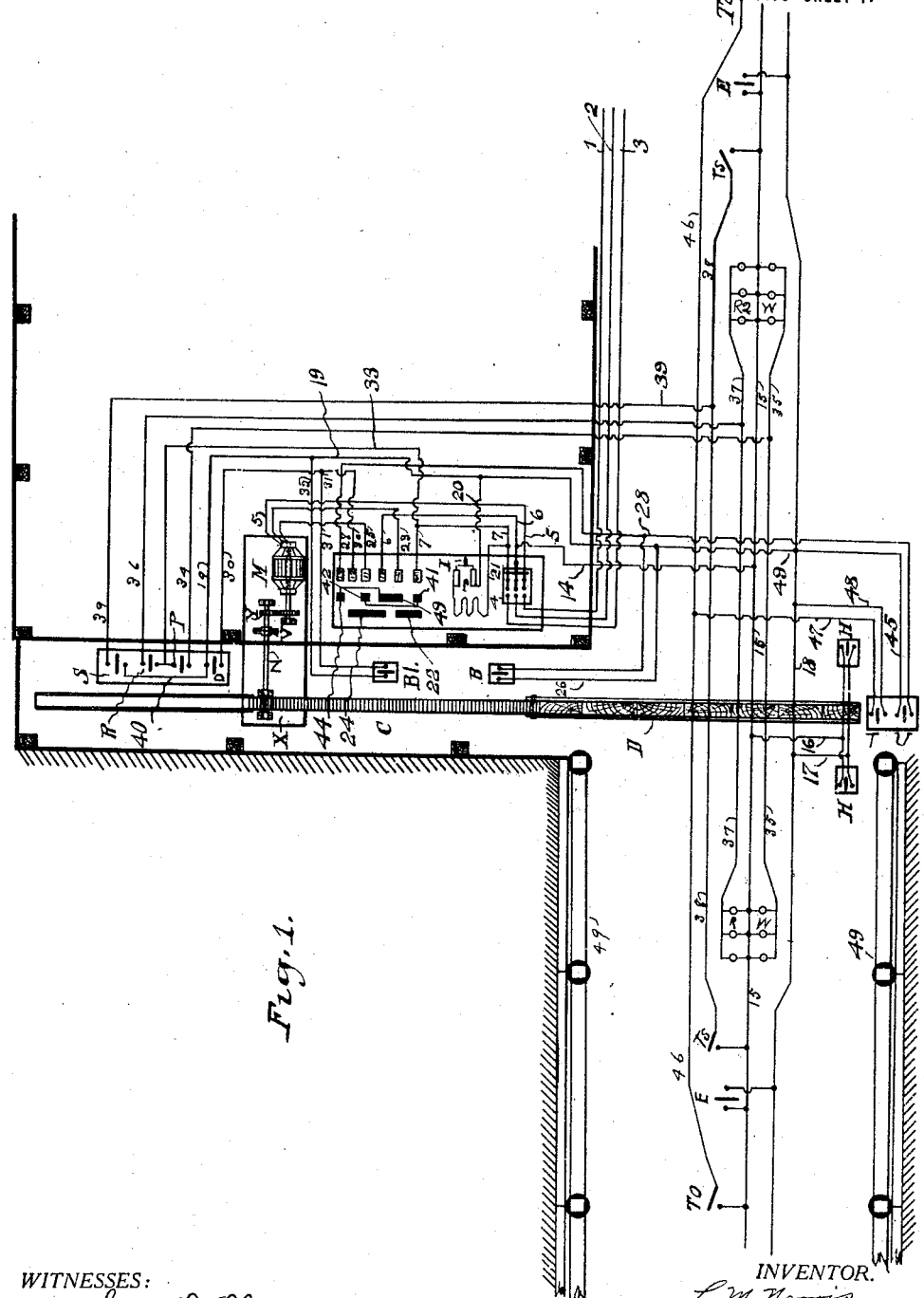
Figure 1 is a diagrammatic view of a system constructed in accordance with the invention.

Referring now to the controller which is best illustrated in Fig. 20 and is illustrated diagrammatically in Fig. 1, it will be seen that this controller comprises the two solenoid magnets J. The cores I of the solenoid magents are formed by the legs of a U-shaped member, the cross member of which carries a coupling 62. A guide rod 59 extends vertically from this coupling and carries rubber bumpers 61 above and below the magnets J. The coupling 62 (see Fig. 18) is connected by a connecting rod 55 with the extremity of a swinging lever G, the latter carrying a pawl 60 which engages a ratchet wheel F that is fast upon the shaft 58 of the controller. Thus it will be seen that energizing of the magnets J will impart a partial rotation to the shaft 58 and to a cylinder A carried thereby, said cylinder and its shaft 58 being supported in bearings L.

At the end of the shaft 58 remote from the ratchet F a star wheel K is disposed and this star wheel is engaged by a roller 51 that is carried by a lever 52 the latter being pivoted at 56. A spring 53 has one end connected to the lever 52 and its other end connected to a screw 54 movable through a bracket 57 under the influence of a thumb nut 54$^a$. The purpose of this construction is to insure that cylinder A will move a definite distance each time the solenoids are energized. The action of the spring 53 in pulling upon the lever 52 forces the roller 51 down into the recesses of the star wheel and positively positions the cylinder A at the desired point.

Contact fingers 8, 9, 10, 11, 12 and 13 bear upon the cylinder A and coöperate with contact plates 22, 24 and 41, 42, 43 and 44 (see Fig. 1) in a manner hereinafter described. The contact plates 41 and 42 being connected at 42$^a$ and the contact plates 43 and 44 being connected at 43$^a$ (see Fig. 21).

The current which is a three phase current, is taken from the line 1—2—3 to a fused, three pole switch, 4; from thence one line 5 runs to the motor, the other two lines leading to the controller fingers 8, 10. The door can be controlled either through the medium of hand switches or automatically by trolley trip switches tripped by the trolley wheels, when used in conjunction with electric locomotives.

H, Fig. 1, diagrammatically represents hand switches, see Fig. 11, one of these switches being located on each side of the door and being used when one wishes to walk in or out. These switches comprise body portions 100 in which rods 101 are movable. These rods carry handles 102 at one end and bridging elements 103 at their opposite ends, adapted to bridge the space between the contact plates 104, 105. Springs 106 act against collars 107 on the rods 101 to move the bridging elements 103 away from the contact plates 104, 105. Thus when these switches are to be used the operator must hold the switch in closed position until the door has completed the desired movement.

In the diagrammatic view Fig. 1, letters TO and TS represent trolley trip switches adapted to span the trolley wire 108, see Fig. 17, and to be actuated by the trolley wheels of electric locomotives, electric cars or the like. These switches are located from three hundred to five hundred feet from the door on each side, as the installation will best permit. Letters E represent hand switches to be used in cases of emergency only, should switches TO or TS fail to work and are located an equal distance between TO and TS.

Referring particularly to Fig. 1, the operation of the device is as follows: The current after passing through the three pole switch 4 to conductors 5, 6 and 7 is distributed to different circuits, conductor 5 being permanently connected to motor M and conductors 6 and 7 being connected to controller fingers 10 and 8. When either of the switches H is used the solenoid circuit is closed, the current being taken from line 6 through conductor 14 to conductor 15, thence to conductor 16, through switches H, to conductors 17, 18, 19 and 20, to solenoids J, the solenoid circuit being completed through conductor 21 to main 7. This circuit being complete the solenoids become energized causing the armature to rise (see Fig. 20). This revolves the contact cylinder A a quarter turn, resulting in contact being made by fingers 8, 9 through contact 22 to conductor 23, to motor M, through fingers 10, 11, through contact 24 to conductor 25 and thence to motor M. The motor circuit is now completed and the door travels until contact is made by the abutment N projecting from the side of the door, with a switch B$^1$. Then the solenoid circuit is closed from controller finger 10 through contact 24 to finger 12, thence to conductors 30, 31, through switch B$^1$ to conductors 32, 19, 20 and to solenoids J. This circuit being complete through conductors 21 to 7 the solenoids are energized and lift the armature, which revolves the contact cylinder a quarter turn more. This places the fingers on a blank section of the contact cylinder, thereby breaking all connections to the motor and the door must stop. The switches B$^1$ and B are adjustable stop switches, shown in detail in Figs. 7 and 7$^a$ and it is to be understood that they are merely diagrammatically shown in Fig. 1. They serve to cut out the motor, permitting the door to complete its travel under its own momentum. As the door nears the end of its travel toward open position its edge strikes the switches O, P, R and S to actuate all of said switches simultaneously making contact at O and P and breaking the contact at R and S. These switches are disposed in a vertical row so that the door may simultaneously engage all of them. It is to be understood that the showing of these switches in Figs. 1 and 2 is a diagrammatic one, made so for the purpose of showing the arrangement of the circuits with respect to these switches. However the other figures of the drawing make it clear that these switches are disposed in a vertical row and in position to be simultaneously engaged and actuated by the edge of the door. The construction of these switches is illustrated in Figs. 3, 3$^a$ and 6, 6$^a$. In the form of switch shown in Figs. 3 and 3$^a$ 109 indicates the body portion through which a rod 110 is movable. This rod carries a head 111 adapted to have contact with abutment N. A spring 112 encircles the rod and acts against a collar 113 and normally moves a bridging element 114 to a position where it establishes connection between contact plates 115 and 116. When the rod 110 is thrust toward the left in Fig. 3 the bridging element 114 is forced from between the contact plates and breaks the circuit. In the form of switch illustrated in Fig. 6, 117 indicates a body portion through which a rod 118 moves. This rod carries a head 119 adapted to have engagement with the edge of the door. A spring 120 encircles the rod 118 and bears against a collar 121 carried by the rod. This springs acts to move a bridging element 122 from between contact plates 123 and 124. When the door strikes the head 119 it forces the bridging element to circuit completing position between these contact plates. The switches B and B$^1$ are held by counter springs $bx$ and when the abutment N strikes the switch the springs permit the switch to turn on the shaft in its direction of the travel of the door, and when released will immediately spring back into position.

The switch O is an emergency stop switch used for the purpose of stopping the door should switch B$^1$ fail. When the door strikes this switch it completes a circuit from finger 10 to contact 24 to finger 12, to conductor 30, through switch O to conductors 19 and 20 to solenoids J through conductor 21 to main 7. The solenoid circuit now being complete the armature thereof is lifted and the contact cylinder is turned one quarter turn to a blank on the cylinder, thereby breaking the circuit and causing the motor to stop. The switch indicated at P is for the purpose of switching on the signal lights W which are clear or white lights, these lights indicating that the door is open. This switch is forced into contact by the door in a manner similar to the action of switch O, completing the circuit from conductor 7 through 33, switch P, conductors 34 and 35 to lights W and back through 15 and 14 to 6.

Switch R is for the purpose of controlling the lights R$^2$ which represent red lights indicating that the door is closed. These lights are showing all the time that the door is closed or even when the door is partially closed and the door must be entirely open before the lights are to disappear and lights W show. The door strikes this switch, forcing it open, and, the circuit being broken, the lights disappear. When the door moves away toward the closed position, the switch R is brought back into contact by the spring on the plunger which completes the circuit from conductor 7 through 33, switch R, conductors 36 and 37 through lights R$^2$ to conductors 15 and 14 and thence to main 6.

Switch S is in series with trolley trip switch TS. It is for the purpose of preventing the door from being closed when it should remain open. For example, where two electric locomotives are working on one train, the first locomotive making contact at TS closes the door, the other locomotive having no effect for the reason that the door, having been pulled away from switch S has acted to break the circuit. This circuit is taken from main 6, through 14 to 15, through switch TS, through conductors 38 and 39, switch S, conductors 40, 19 and 20, to solenoids J, completing the circuit through conductor 21 to main 7. This energizes the solenoids raising the armature and causing the contact cylinder to revolve a quarter turn, making contact with controller fingers, and closing the motor circuit, one phase from finger 8 through contacts 41 and 42, the finger 11, and conductors 25 and motor M. The third phase, from finger 10 through contact 43 to finger 9, conductor 23 and motor M. The circuit now being complete, and the motor reversed, the door being in the open position, must travel toward the closed position until contact is made at B by N. This closes the solenoid circuit from finger 10 through contacts 43 and 44 to finger 13, through conductors 28 and 27, switch B and conductors 26, 19 and 20 to solenoids J, completing the circuit through conductor 21 to main 7, thereby again energizing the solenoids, raising the armature and revolving the contact cylinder a quarter turn to a blank, breaking the motor connection and allowing the door's momentum to propel it into its closed position.

The switch U is an emergency stop switch, as is also switch O, but is on the opposite end of the doorway; its purpose is to stop the motor should switch B fail. The door must come to a stop when contact is made with this switch; this prevents the clutch V from burning out. The circuit is taken from finger 10 to contact 43 and contact 44 to finger 13, to conductor 28 through switch U, conductors 4, 5, 19 and 20 to solenoids J, completing the circuit through 21 to main 7, energizing the solenoids, raising the armature and revolving the contact cylinder a quarter turn to a blank section thereon, thereby breaking the motor circuit.

The switches B¹, B, O, and U, are connected through the contact cylinder, for the purpose of breaking the solenoid circuit and guarding the solenoids from being continually energized while the door is holding the switches in, while at rest in the open or closed positions.

Switch T, like S, but at the opposite end of the door's travel, is connected in series with the trolley trip switch TS and is used for the same purpose as is the switch S. It is necessary for the door to be in a closed position and making contact at T, the switch TO would not affect the operation of the door. Should the door be in the open position, it would be impossible for it to close should a locomotive or train be approaching it, and possibly result in a wreck. The circuit for this switch T is from conductors 6 to 14 and 15 through switch T, conductors 46 completing the circuit through 21 to 7.

The trolley trip switch, see Fig. 17, comprises a fork 75 that is adapted to straddle the trolley wire 108 as above set forth, said fork being carried by a sleeve 74, adapted to engage a shaft 76 that is mounted in bearings 70 and carries a cylinder 68. A contact plate 80 carried by this cylinder is adapted to bridge the space between contact fingers 82. The shaft 76 carries a swinging arm 71 which in turn carries a stud 71ª, to which a plunger 73 is connected, this plunger operating in the cylinder 72 and the cylinder and plunger constituting a dash pot.

I claim—

1. The combination with a trackway, of a sliding door operable thereacross, an electric motor, connections between the door and the motor whereby the door may be actuated by the motor, a trolley wire, a trolley trip switch disposed in juxtaposition to said wire to be actuated by a trolley traveling on said wire, connections between the trolley trip switch and the motor and limit switches included in the motor circuit, said limit switches being disposed at the opposite ends of the door's travel.

2. A structure as recited in claim 1 in combination with emergency stop switches operable upon failure of the limit switches.

3. The combination with a door of a motor for actuating the same, a controller comprising a rotative cylinder, solenoids magnets, connections between the magnets and the cylinder for imparting a step-by-step movement to the cylinder, contact plates carried by the cylinder, a plurality of contact fingers disposed in the path of movement of the contact plates, a plurality of electric circuits leading from said contact fingers, limit switches included in some of said circuits and means carried by the door for engaging said limit switches.

4. A structure as recited in claim 3 in combination with a plurality of switches disposed at the limit of movement of the door and adapted to be simultaneously actuated by the movement of the door, some of said switches being moved to open position and other of said switches being moved to closed position when the door contacts therewith and a plurality of circuits controlled by the last named switches.

5. A trolley trip switch comprising an oscillatory cylinder, a contact plate carried thereby, a pair of contacts adapted to be bridged by said plate, a shaft by which the cylinder is carried, forks carried by said shaft adapted to straddle a trolley wire and a dash pot connected to said shaft.

6. A structure as recited in claim 5 in combination with a spring acting to return the fork to vertical position after each actuation of the same.

7. A controller comprising a pair of solenoids, a U-shaped member the legs of which constitute the cores for said solenoids, means for cushioning the action of said cores, a connecting rod pivotally connected to said cores, a horizontally disposed shaft, a swinging arm upon said shaft with which the connecting rod is connected, a pawl carried by said swinging arm, a ratchet wheel upon the shaft with which the pawl engages, a cylinder upon the shaft, a plurality of contact plates carried by the cylinder, a plurality of contact fingers with which said contact plates coact and means for bringing said cylinder to a definite point in its rotation after each actuation of the same.

8. A structure as recited in claim 7 wherein the last named means comprises a swinging arm, a roller carried thereby, a star wheel upon the shaft with which the roller coacts and spring means for drawing the arm toward the shaft.

In testimony whereof I affix my signature in the presence of two witnesses.

LEROY M. NORRIS.

Witnesses:
H. J. HULL,
ROSE W. BROWN.